Patented Sept. 10, 1946

2,407,405

UNITED STATES PATENT OFFICE 2,407,405

STABILIZATION OF TETRAFLUORO-
ETHYLENE

Melvin Adam Dietrich, Claymont, and Robert Michael Joyce, Jr., Marshallton, Del., assignors to E. I. du Pont de Nemours & Company, Wilmington, Del., a corporation of Delaware No Drawing. Application February 15, 1943,
Serial No. 476,028

7 Claims. (Cl. 260—652.5)

This invention relates to a method for preventing the polymerization of tetrafluoroethylene and to compositions of matter comprising tetrafluoroethylene.

Tetrafluoroethylene, being a gas boiling at −76° C. with a critical temperature of 33.3° C., would be stored desirably in the normal manner by placing the material under pressure in a steel container and allowing it to stand at room temperature. This method of storage is, however, not possible because, in accordance with the teaching of U. S. Patent 2,230,654, polymerization takes place when tetrafluoroethylene is subjected to superatmospheric pressure at 20° to 25° C. for a few days. Prior to this invention it has been the practice to store tetrafluoroethylene at the temperature of solid carbon dioxide since only in this way could the spontaneous polymerization be prevented during storage for any substantial length of time. The tendency to spontaneous polymerization is less at low pressures, for example, tetrafluoroethylene at one atmosphere at room temperature would undergo very little polymerization over a period of weeks or months. The storage, and especially the handling of tetrafluoroethylene at atmospheric pressure is, however, extremely impractical and for some purposes (as in compression systems for the controlled polymerization of tetrafluoroethylene) impossible.

This invention has as an object the production of stable tetrafluoroethylene which can be stored at normal temperature and superatmospheric pressure for an indefinite period of time without undergoing spontaneous polymerization. A further object is a method for treating tetrafluoroethylene whereby this material can be handled at room temperature and superatmospheric pressure in piping systems without clogging the tubing and valves because of spontaneous polymerization. Other objects will appear hereinafter.

Tetrafluoroethylene, in common with most other gases for which precautions to the contrary have not been taken, contains a small amount of oxygen, generally from about 0.1% to 0.2% by volume. In other gases, such as hydrogen, nitrogen, ethylene, and carbon dioxide, this small amount of oxygen is inconsequential and is generally ignored since this oxygen is without effect on the gas itself and can be left in the gas without bringing about any change in the gas. We have now discovered that tetrafluoroethylene differs from other gases in that the small amount of normally contained oxygen causes the polymerization, previously referred to, which takes place on storing at room temperature and superatmospheric pressure. We have further discovered that by removing this oxygen completely or essentially so, namely, to a concentration of not more than 40 parts of oxygen in a million parts of tetrafluoroethylene, it is possible to store the tetrafluoroethylene at 25° C. under superatmospheric pressure for several months without appreciable polymerization.

It is a surprising and hitherto unsuspected fact that so small a quantity of oxygen as 0.1% by volume should be responsible for the polymerization of tetrafluoroethylene under such mild conditions as room temperature and superatmospheric pressure. The importance of this discovery is emphasized by the fact that we have found it impossible to handle ordinary liquid tetrafluoroethylene under superatmospheric pressure and room temperature in piping systems consisting of small bore high pressure steel tubing and needle valves because polymerization quickly produces a plug in the lines or in the valves. On the other hand, tetrafluoroethylene of which the oxygen content has been reduced to 20 parts per million is stable under these conditions and can be handled satisfactorily in such lines and valves without plugging. This discovery has, therefore, made possible the handling of liquid tetrafluoroethylene in room temperature piping systems.

The desired reduction in the oxygen content can be accomplished either by the mechanical removal of the oxygen from the tetrafluoroethylene or by adding to the tetrafluoroethylene small amounts of oxygen-reactive materials. Illustrative of the first mentioned method is removal by fractional distillation, preferably at low temperature and superatmospheric pressure; by scrubbing the tetrafluoroethylene with an oxygen-reactive solution, such as a solution of a chromous salt, "silver salt" (an alkaline solution containing sodium hydrosulfite and sodium beta-anthraquinone sulfonate); or by passing the gas over a metallic catalyst, such as copper or nickel at elevated temperatures. The most valuable of the oxygen-reactive materials which can be added to the tetrafluoroethylene to bring about the desired stabilization against polymerization are those compounds which are capable of reacting with oxygen at atmospheric pressure and normal temperature. An example of a material of this kind is "Terpene B" hydrocarbon mixture which is a terpene fraction consisting principally of dipentene and terpinolene boiling at 176° to 196° C., having an $n_D^{20}$ of 1.470–1.478, and a density of 0.855–0.870 at 15.5° C. Oxygen-containing tetrafluoroethylene to which has been added about 0.5% of this hydrocarbon mixture undergoes no polymerization whatever on storage at room temperature and superatmospheric pressure, conditions under which the unstabilized tetrafluoroethylene polymerizes appreciably in a few days.

The invention is further illustrated by the following examples:

Example I

Tetrafluoroethylene is subjected to fractional distillation in a steel still at −19° C. and 128 lbs./sq. in. pressure, the oxygen-rich foreshot being topped off and discarded. The remaining tetrafluoroethylene, after distillation, contains only 7 parts per million of oxygen. Three glass tubes, to one of which is added 0.1 cc. of "Terpene B" hydrocarbon mixture, are flushed with low-oxygen nitrogen (15–20 parts per million of oxygen) and then cooled in solid carbon dioxide-methanol. Each of the tubes is filled about half full of liquid tetrafluoroethylene containing 7 parts per million of oxygen by passing the gaseous tetrafluoroethylene into the tube under slight positive pressure which is maintained by a mercury column thereby condensing the gas. Tube #1 is then transferred to a bath of liquid nitrogen to freeze the tetrafluoroethylene; the free space in the upper part of the tube is displaced with air, and the tube is sealed with a torch. Tube #2, to which the "Terpene B" hydrocarbon mixture had been added, is treated similarly. Tube #3 is transferred to the liquid nitrogen to freeze the tetrafluoroethylene, a current of nitrogen containing 15 to 20 parts per million of oxygen being passed into the tube to prevent access of air, and the tube is then sealed. The three tubes are removed from the liquid nitrogen and allowed to stand at room temperature under the vapor pressure of tetrafluoroethylene (about 27 atm.). In less than 17 hours the tetrafluoroethylene in tube #1, which contained air and no stabilizing agent, forms a solid piece of polymer in the tube. Tubes #2 and #3 are free of polymer. After standing 4 months under these conditions tube #2 contains no polymer whatever. At the end of this period tube #3 contains only a trace of polymer which is formed as the result of the oxygen content of the nitrogen with which the tube was flushed before sealing.

Example II

To one of two glass tubes similar to those employed in Example I is added 0.1 cc. of "Terpene B" hydrocarbon mixture. Both tubes are then cooled in liquid ethylene and half filled with liquid tetrafluoroethylene by condensation of the gas. The tetrafluoroethylene employed for these experiments had not been subjected to any special treatment and contains approximately 0.2% oxygen by volume. The tubes are then transferred to a bath of liquid nitrogen and sealed. The tubes are then removed from the cold bath and allowed to stand at room temperature under the vapor pressure of tetrafluoroethylene. The unstable tetrafluoroethylene in the tube to which no "Terpene B" had been added polymerizes to a solid white block in less than one week. On the other hand, the stable tetrafluoroethylene containing the "Terpene B" does not polymerize at all after standing 5 months at room temperature and superatmospheric pressure.

Example III

Ordinary tetrafluoroethylene (containing about 0.2% oxygen by volume) undergoes some polymerization after standing for about a month in a steel cylinder in the absence of its liquid phase under 200 lbs./sq. in. pressure at room temperature. This polymerization is a serious matter in the storage of gaseous tetrafluoroethylene since the polymer often forms near the valve in the cylinder and prevents the removal of the unpolymerized monomer. This tertafluoroethylene is stabilized against such polymerization by the addition of 0.5% by weight of "Terpene B" hydrocarbon mixture to the storage container. This stable tetrafluoroethylene can be stored for several months without any polymerization taking place.

Example IV

Ordinary oxygen-containing tetrafluoroethylene is stabilized against polymerization with about 0.5% by weight of the following compounds, employing the method described in Example II. The stabilizers employed are tetrahydronaphthalene, benzaldehyde, octene-1, methyl methacrylate, cobalt naphthenate (3% solution in mineral spirits), and alpha-pinene. None of these stable tetrafluoroethylenes undergoes any polymerization in three months at room temperature under its own vapor pressure. The control experiment with unstable tetrafluoroethylene undergoes considerable polymerization in two weeks, and in one month tetrafluoroethylene polymer forms a solid block in the glass tube.

Tetrafluoroethylene is stabilized with compounds which react with oxygen on standing in air at ordinary temperature and pressure. By this is meant not only those compounds which are essentially quantitatively reacted on standing in air for a brief period, but also those compounds which react more slowly with oxygen on being agitated in an oxygen atmosphere at ordinary temperature and pressure. Of these the organic are preferred over the inorganic compounds.

Organic compounds which are suitable for the stabilization of tetrafluoroethylene include those containing a multiple bonded carbon atom as is present in compounds containing ethylenic, acetylenic and aldehydic linkages. Examples of compounds containing the ethylenic linkage include the ethylenic hydrocarbons such as hexenes and octenes, terpene hydrocarbons, vinyl cyclohexene, and cyclohexene; the unsaturated acids, such as naphthenic acids, methacrylic acid, crotonic acid, undecylenic acid, as well as their esters, amides, and salts; the unsaturated nitriles, such as allyl cyanide; the unsaturated amines, such as crotylamine; the unsaturated alcohols, such as allyl alcohol and cinnamyl alcohol; the unsaturated aldehydes, such as acrolein, and the corresponding unsaturated acetals; and the unsaturated ethers such as dioxene.

Examples of operable compounds which contain the acetylenic linkage are 1-pentine, propiolic acid, and its derivatives, for example, esters, amides and salts, and mono- and divinyl acetylenes.

Particularly useful are those compounds in which there is no hydrogen atom on at least one multiple bonded carbon atom. These compounds are particularly susceptible to reaction with atmospheric oxygen, and are of great utility as stabilizers for tetrafluoroethylene. For example, among such hydrocarbons are many terpenes, such as alpha-pinene, dipentene, and terpinolene, and also such compounds as tetrahydronaphthalene. Likewise, methacrylic acid and its functional derivatives, for example, esters, amides and salts, are illustrative of unsaturated acids of this class.

Other oxygen-reactive compounds include aliphatic and aromatic aldehydes, such as formaldehyde, acetaldehyde, and benzaldehyde; aliphatic and aromatic amines, such as dibutylamine, tributylamine, aniline, and diphenylamine; and aliphatic and aromatic mercaptans, such as butyl mercaptan, octyl mercaptan, thiophenol, and thio-beta-naphthol.

The amount of such stabilizer to be employed naturally depends on the oxygen content of the tetrafluoroethylene which is to be stabilized. Broadly speaking, stabilizers are employed in amounts ranging from about 0.01% to 5% or 10%, based on the amount of tetrafluoroethylene. In most cases the stabilizer is employed in the amount of about 0.01% to about 1% by weight based on the amount of tetrafluoroethylene.

Tetrafluoroethylene containing less than 20 parts per million of oxygen can be stored or handled at room temperature and superatmospheric pressure, either as a gas or as a liquid, for several weeks without undergoing any polymerization. Tetrafluoroethylene containing 20 to 40 parts per million of oxygen can be handled under such conditions for short periods of time, for example, 1-2 days without any polymerization taking place. At some inconvenience, tetrafluoroethylene containing 20 to 40 parts per million of oxygen can be stored at 0° C. for longer periods of time, for example, a few weeks, without any spontaneous polymerization. The stabilization of tetrafluoroethylene by the removal of oxygen can be accomplished as previously mentioned by fractional distillation to remove the oxygen in a foreshot, preferably at low temperature and superatmospheric pressure, or by scrubbing the tetrafluoroethylene with oxygen-reactive liquids, such as solutions of chromous salts, cuprous salts, particularly cuprous ammonium salts, or "silver salt" (an alkaline solution of sodium hydrosulfite containing sodium beta-anthraquinone sulfonate as the catalyst, J. Am. Chem. Soc. 46, 2639 (1924)).

The present invention presents a valuable economic advantage not only from the fact that tetrafluoroethylene stabilized by the process of this invention can be stored for long periods of time without the polymerization which occurs in the commercially obtained oxygen-containing tetrafluoroethylene, but also from the fact that the stabilized tetrafluoroethylene can be transmitted satisfactorily, particularly in the liquid phase, through high pressure tubes and valves, without any stoppages due to the formation of polymer plugs. Such handling is impossible with unstable tetrafluoroethylene. Chemical stabilizers can be removed if desired either by fractional distillation or by scrubbing with a liquid which adsorbs or reacts with the stabilizer.

As many apparently widely different embodiments of this invention may be made without departing from the spirit and scope thereof, it is to be understood that we do not limit ourselves to the specific embodiments thereof except as defined in the appended claims.

We claim:
1. Tetrafluoroethylene stabilized with sufficient ethylenically unsaturated hydrocarbon to prevent polymerization of the tetrafluoroethylene at 25° C. and superatmospheric pressure.
2. Tetrafluoroethylene stabilized with sufficient amount of a terpene hydrocarbon to prevent polymerization of the tetrafluoroethylene at 25° C. and superatmospheric pressure.
3. A process for treating tetrafluoroethylene which substantially reduces its tendency to spontaneous polymerization at 25° C. and superatmospheric pressure, said process comprising incorporating into the tetrafluoroethylene a small amount of an ethylenically unsaturated hydrocarbon.
4. The process set forth in claim 3 in which said unsaturated hydrocarbon is a terpene hydrocarbon.
5. The process set forth in claim 3 in which said ethylenically unsaturated hydrocarbon is added in amount of from 0.01% to 10% by weight of the tetrofluoroethylene.
6. Tetrafluoroethylene stabilized with ethylenically unsaturated hydrocarbon in amount of from 0.01% to 10% by weight of the tetrafluoroethylene.
7. Tetrafluoroethylene stabilized with a terpene hydrocarbon in amount of from 0.01% to 10% by weight of the tetrafluoroethylene.

MELVIN ADAM DIETRICH.
ROBERT MICHAEL JOYCE, Jr.